April 17, 1962   H. BERNZOTT   3,029,686
SELF THREADING MOTION PICTURE PROJECTOR
Filed May 23, 1958   8 Sheets-Sheet 1
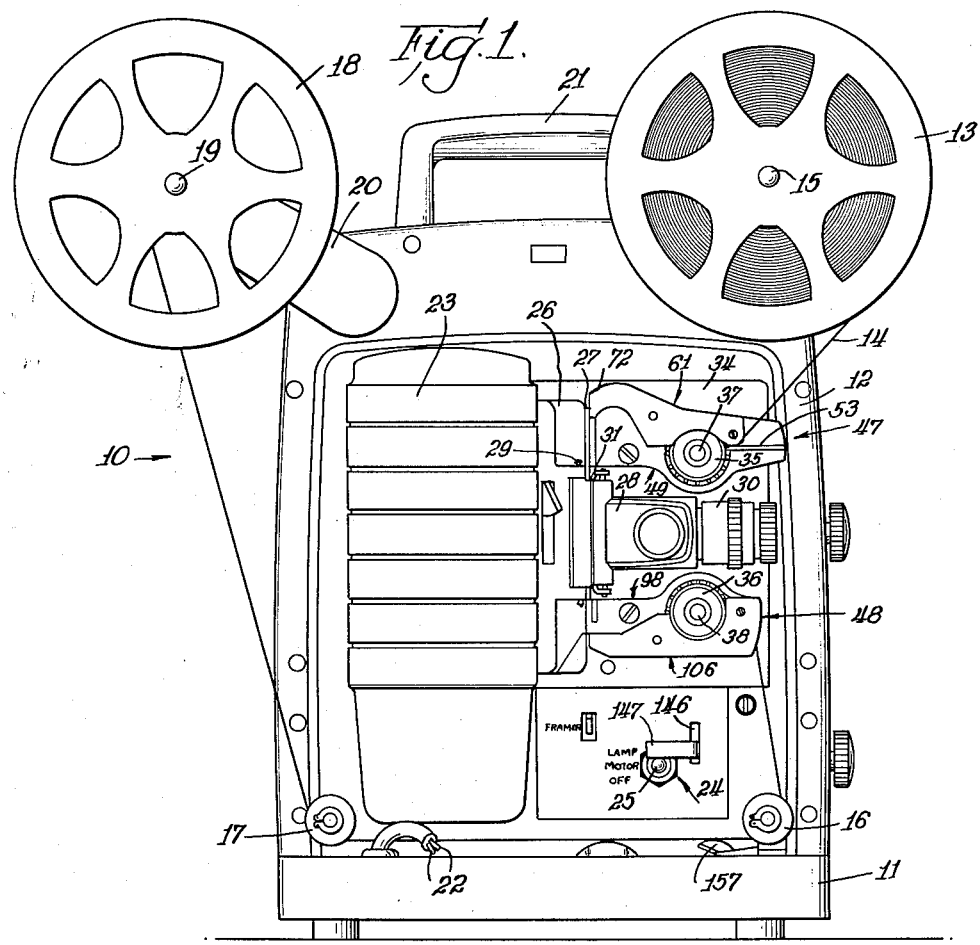
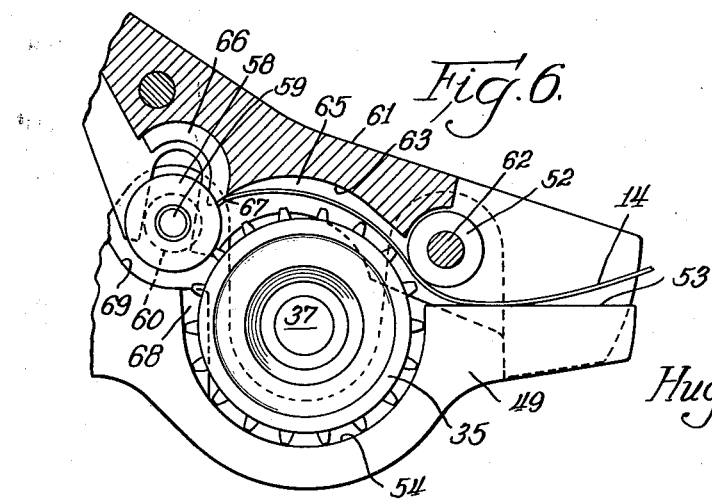
INVENTOR.
Hugo Bernzott
BY
Robert F. Miehle
Atty.

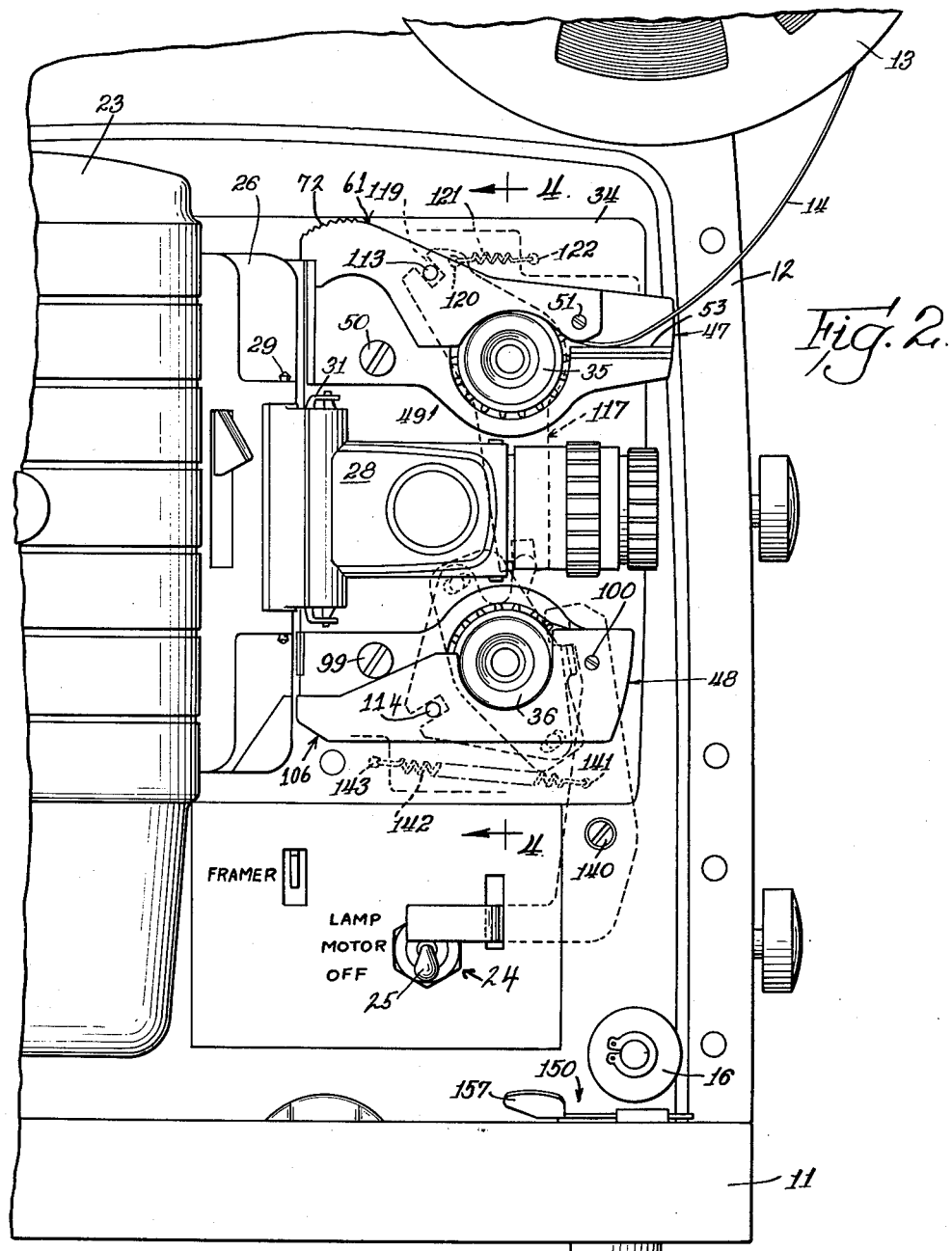

April 17, 1962 H. BERNZOTT 3,029,686
SELF THREADING MOTION PICTURE PROJECTOR
Filed May 23, 1958 8 Sheets-Sheet 3
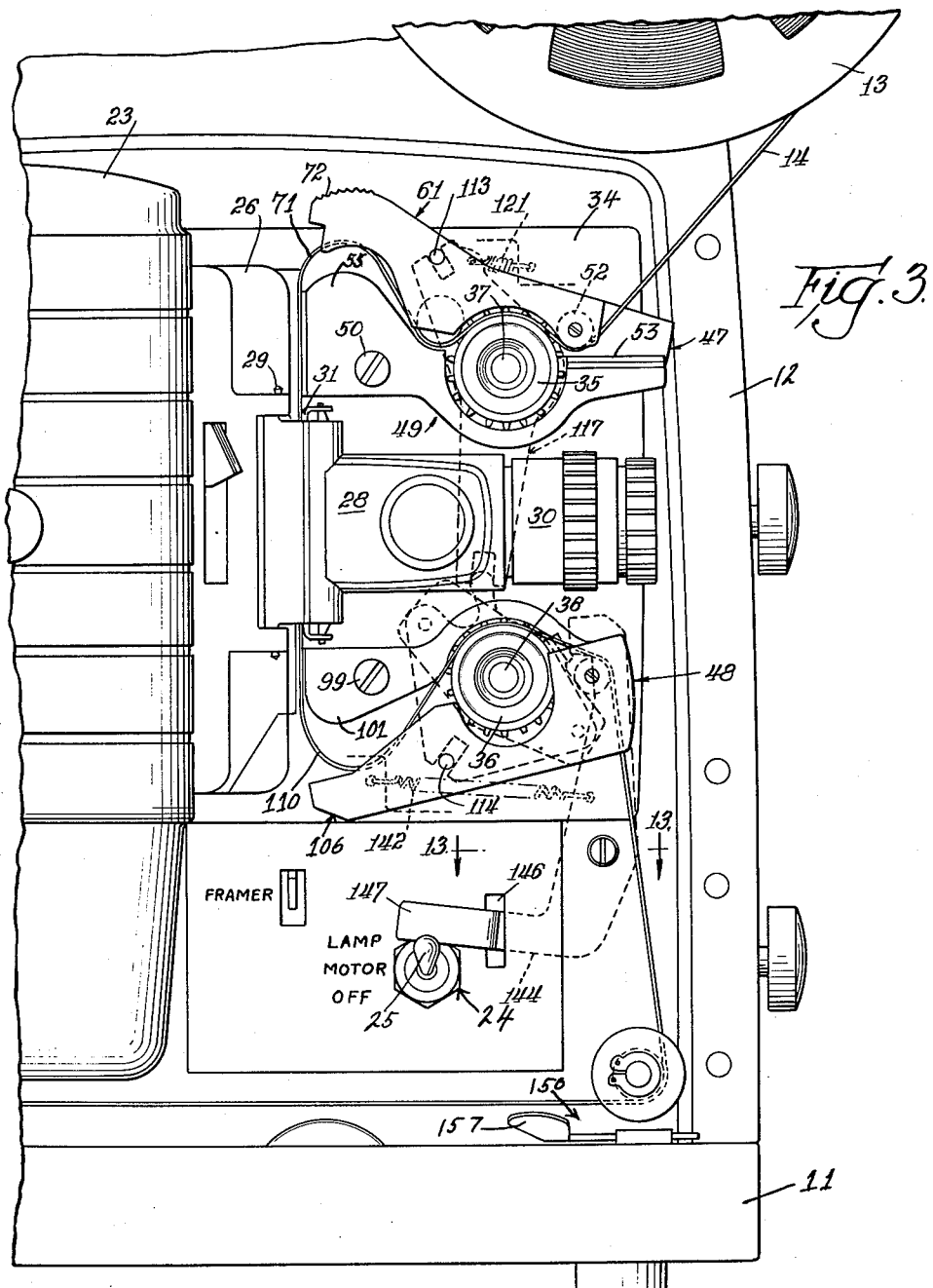

INVENTOR.
Hugo Bernzott

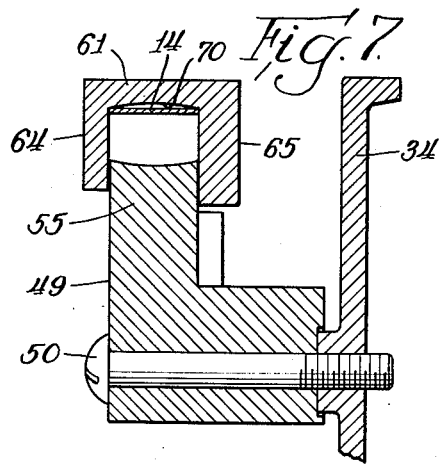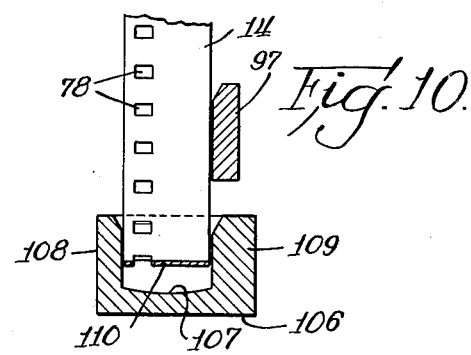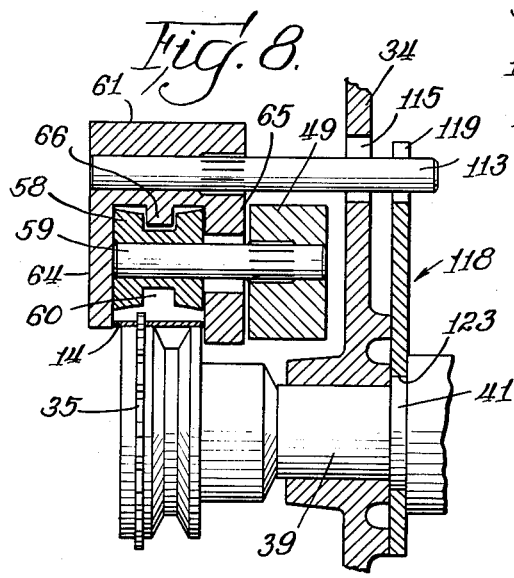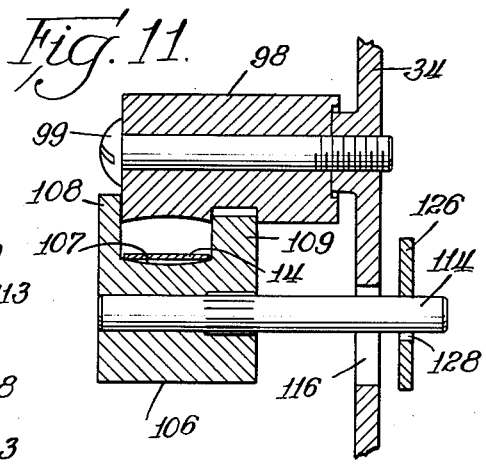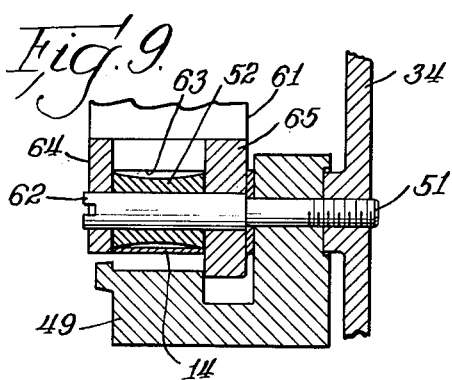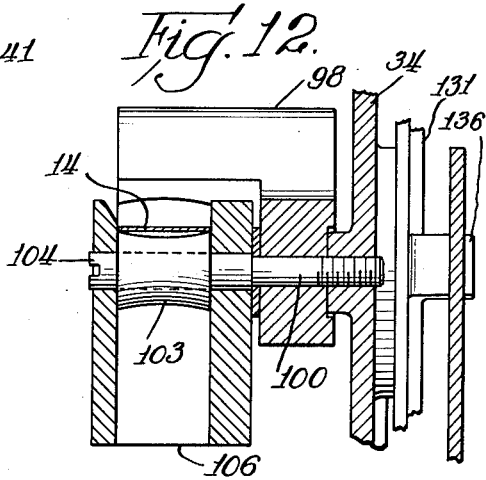

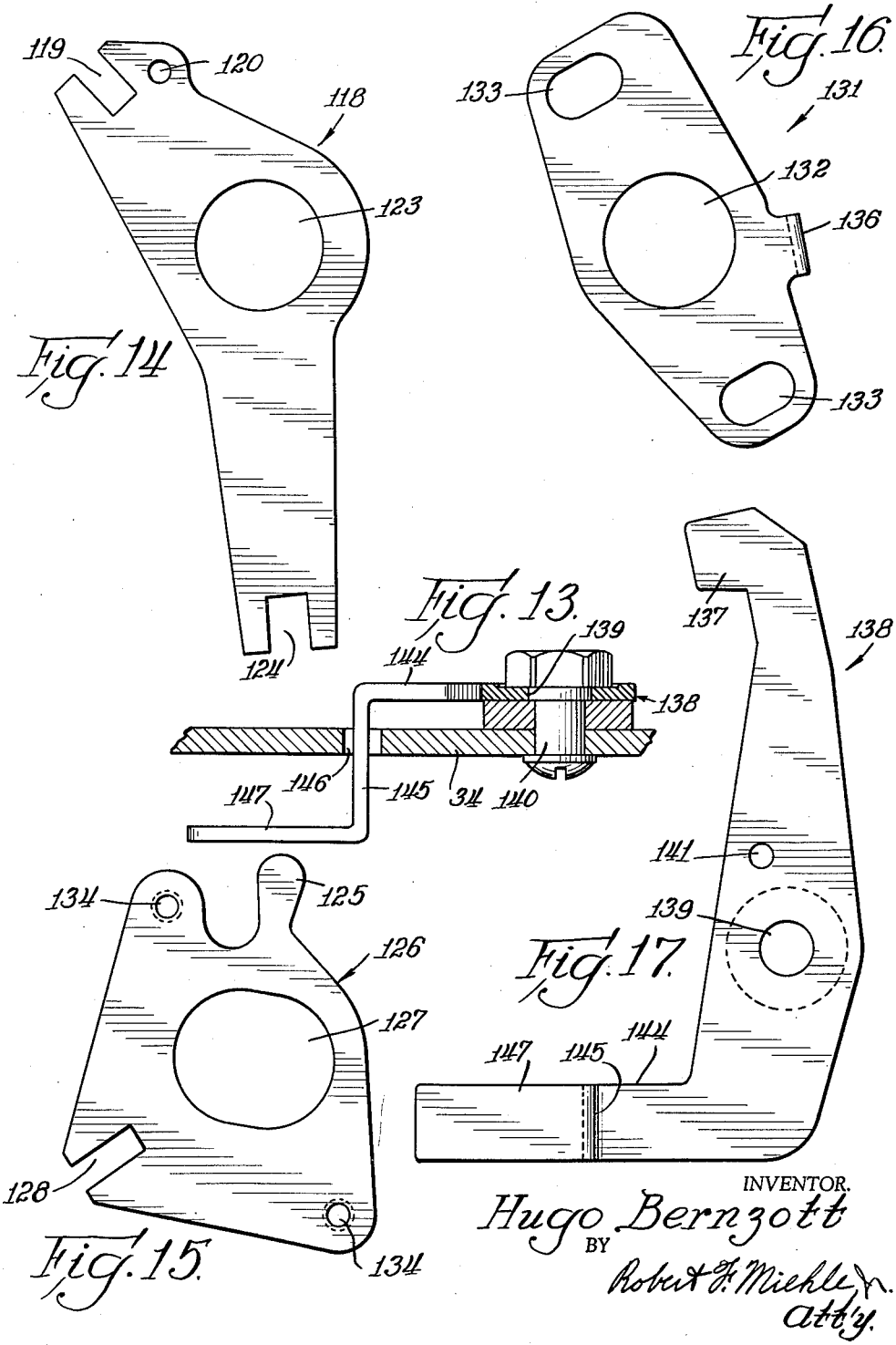

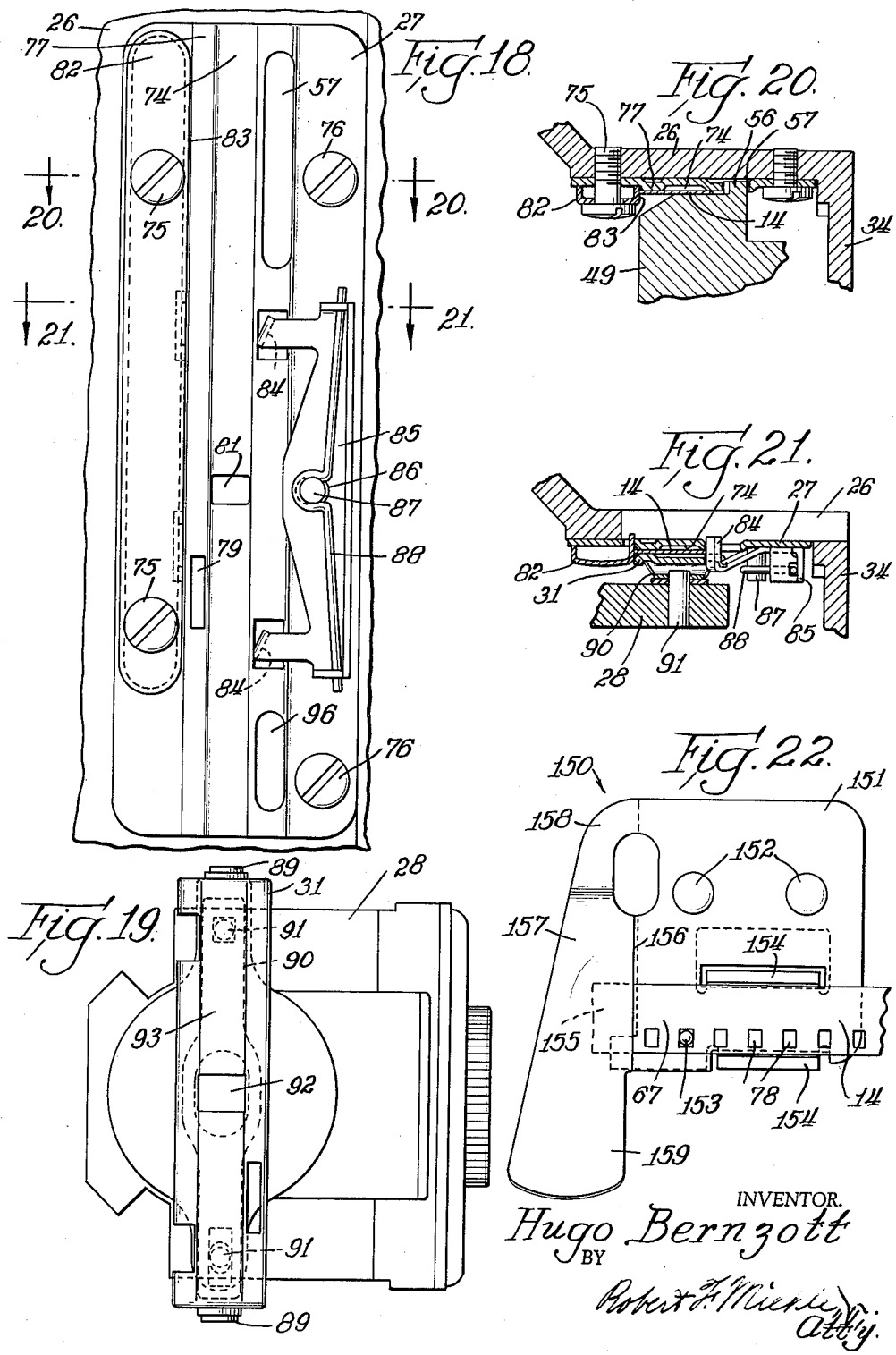

United States Patent Office 3,029,686
Patented Apr. 17, 1962

3,029,686
SELF THREADING MOTION PICTURE PROJECTOR
Hugo Bernzott, Niles, Ill., assignor to Bell & Howell Company, Chicago, Ill., a corporation of Illinois
Filed May 23, 1958, Ser. No. 737,429
9 Claims. (Cl. 88—17)

This invention relates, generally, to motion picture projectors and it has particularly relation to self threading motion picture projectors.

Among the objects of this invention are: To provide for self threading film in a motion picture projector in a new and improved manner; to form film loops of the required size above and below the projection aperture; to move the film loop forming means out of film loop forming position when the film has been threaded through the projector; to provide upper and lower film loop formers and operating mechanism for conjointly operating them; to provide for manually moving the upper and lower film loop formers into film loop forming positions and for automatically moving them away from such positions after the film has been threaded through the projector; to prevent threading of the lead end of the film through the projector unless the loop formers are in their film loop forming positions; to restore the upper and lower film loops during operation of the projector in the event that such action may be required; to bias the upper and lower film loop formers away from their loop forming positions; to latch the upper and lower film loop formers in their loop forming positions and to unlatch them on completion of the threading operation; and to provide for adjusting the relation between the operating mechanism interconnecting the upper and lower film loop formers and the latch mechanism in order to accommodate manufacturing tolerances.

Other objects of this invention will, in part, be obvious and in part appear hereinafter.

This invention is disclosed in the embodiment thereof shown in the accompanying drawings and it comprises the features of construction, combination of elements and arrangement of parts that will be exemplified in the construction hereinafter set forth and the scope of the application of which will be indicated in the appended claims.

For a more complete understanding of the nature and scope of this invention reference can be had to the following detailed description, taken together with the accompanying drawings, in which:

FIGURE 1 is a view, in side elevation, of a motion picture projector in which the present invention is embodied, the cover having been removed in order to make visible certain of the operating parts;

FIGURE 2 is a view, at an enlarged scale, showing in side elevation the self threading mechanism in operative position, the linkage interconnecting the loop formers being shown by broken lines;

FIGURE 3 is a view, similar to FIGURE 2, but showing the upper and lower loop formers in inoperative position with the film having been threaded through the projector;

FIGURE 6 is a sectional view, similar to the upper portion of FIGURE 5 and showing the upper film loop former in the retracted position where threading of the film is prevented;

Figure 5:
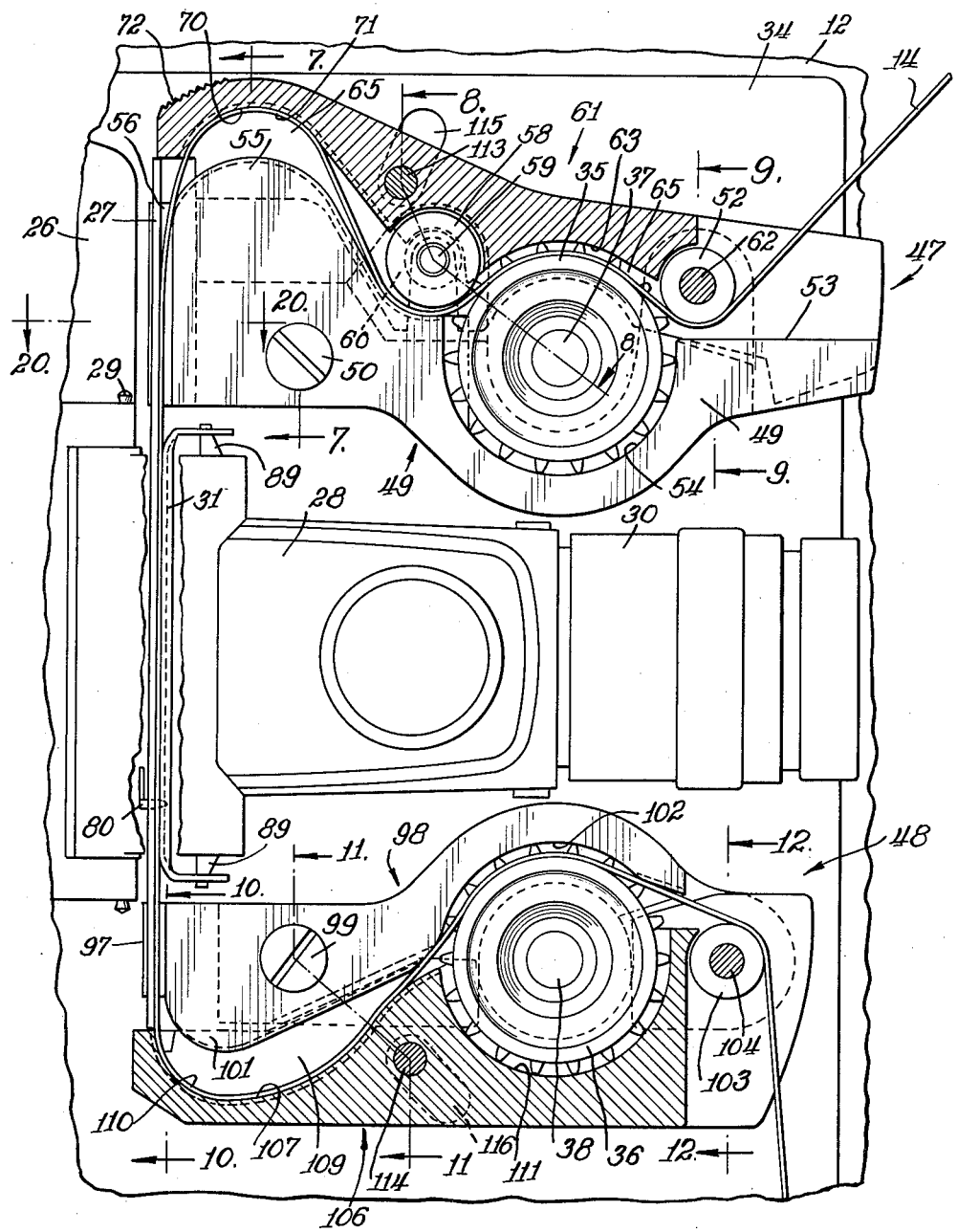
FIGURE 5 is a view, partly in side elevation and partly in section, taken along the line 5—5 of FIGURE 4.

FIGURES 7, 8, 9, 10, 11 and 12 are sectional views taken, respectively, along the lines 7—7, 8—8, 9—9, 10—10, 11—11 and 12—12 of FIGURE 5;

FIGURE 13 is a horizontal sectional view, at an enlarged scale, taken generally along the line 13—13 of FIGURE 3;

FIGURE 14 is a view, in side elevation, of the upper operating lever;

FIGURE 15 is a view, in side elevation, of the lower operating lever;

FIGURE 16 is a view, in side elevation, of an adjusting bracket that is carried by the lower operating lever;

FIGURE 17 is a view, in side elevation, of a latch lever which cooperates with the bracket shown in FIGURE 16 to hold it and the operating linkage for the upper and lower loop formers in the self threading positions;

FIGURE 18 is a view, in front elevation, of the aperture plate with certain elements of the projector mechanism mounted thereon;

FIGURE 19 is a vertical elevational view of the pressure plate which, in operative position, is located immediately in front of the aperture plate shown in FIGURE 18;

FIGURE 20 is a horizontal sectional view taken generally along the line 20—20 of FIGURES 5 and 18;

FIGURE 21 is a horizontal sectional view taken generally along the line 21—21 of FIGURE 18 and including a showing of the pressure plate; and FIGURE 22 is a top plan view of a film cutter that is provided on the base of the projector in order to cut the lead end of the film so as to insure that the mechanism can automatically thread it through the projector.

Referring now particularly to FIGURE 1 of the drawings, it will be observed that the reference character 10 designates, generally, a motion picture projector which includes a base 11 and a support or upstanding frame plate 12 on which a film reel 13 is mounted carrying a film 14 which is to be displayed. The film reel 13 is rotatably mounted at 15 on the support or upstanding frame plate 12 and, after being fed through the projecting mechanism to be described, is trained over guide pulleys 16 and 17 on the support or upstanding frame plate 12 near the bottom thereof and thence over a take up reel 18 which is rotatably mounted at 19 on an arm 20. It will be understood that the film 14 is unwound from the film reel 13 and, after having been displayed, is wound on the take up reel 18. A carrying handle 21 is secured to the upper end of the support or upstanding frame plate 12 to facilitate movement of the projector 10. Conductors 22 are arranged to connect the electrically driven and energized parts of the motion picture projector 10 to a suitable source of current such as a 115 volt 60 cycle source. It will be understood that the conductors 22 connect a drive motor and a projection lamp for energization to the source.

The projection lamp which is specially designed and may have a rating of 500 watts is located in a lamp house 23. The operating motor and lamp in the lamp house 23 are arranged to be energized by a switch which is shown, generally, at 24. The switch 24 has an "off" position in which a handle 25 is in a lowermost position as shown in FIGURE 2 of the drawings. In the central position of the switch 24, as shown in FIGURE 1, only the drive motor is energized. When the control member or handle 25 is in the upper position, shown in FIGURE 3, both the drive motor and the projection lamp are energized. As described hereinafter, advantage is taken of the different positions of the control member or handle 25 for effecting movement of the upper and lower film loop formers to the inoperative positions after the film 14 has been threaded through the projector.

Immediately in front of the lamp house 23 is a shuttle housing 26 on which an aperture plate 27 is mounted. In front of the aperture plate 27 there is a lens barrel support 28 which is pivoted at 29 on the shuttle housing 26 and which carries a pressure plate 31 between which and the aperture plate 27 the film 14 is fed as will be understood readily.

Extending forwardly from the shuttle housing 26 and mounted on the support or upstanding frame plate 12 is a mechanism plate 34. In the claims the support or upstanding frame plate 12 and the mechanism plate 34 are referred to as a "support." For convenience in manufacturing the mechanism plate 34 is fabricated separately from the support or upstanding frame plate 12 and is secured thereto to proide a unitary construction.

As shown in FIGURES 1, 2, 3 and 4 of the drawings an upper film sprocket 35 is rotatably mounted on the mechanism plate 34. Directly below and spaced from the upper film sprocket 35 there is a lower film sprocket 36. The upper and lower film sprockets 35 and 36 are secured to and rotate with upper and lower shafts 37 and 38 which are rotatably mounted in upper and lower bearings 39 and 40, respectively, that are carried by the mechanism plate 34. It will be understood that the upper film sprocket 35 is directly above the lower film sprocket 36 and that both are spaced from the aperture plate 27. Hubs 41 and 42 are formed on the upper and lower bearings 39 and 40, respectively, for a purpose to be described hereinafter.

Any suitable mechanism can be employed for driving the upper and lower film sprockets 35 and 36. For example, upper and lower gear wheels 43 and 44 can be secured to the ends of the shafts 37 and 38, respectively, which extend through the mechanism plate 34. A worm 45, driven by the operating motor, is employed for conjointly driving the gear wheels 43 and 44 as will be understood readily. The worm 45 is driven by the electric drive motor, referred to hereinbefore, which also is arranged to drive the take up reel 18 and, under certain conditions, to drive the film reel 13 for rewinding purposes.

In accordance with this invention provision is made for self threading the film 14 over the upper film sprocket 35, between the aperture plate 27 and pressure plate 31 and over the lower film sprocket 36. It is desirable that loops in the film 14 be formed above and below the aperture plate 27 in order to permit projection of the images on the film properly. For this purpose upper and lower film loop forming means 47 and 48 are provided as shown more clearly in FIGURE 5 of the drawings. Since the upper and lower film loop forming means 47 and 48 are different in construction, each will be described individually.

The upper film loop forming means 47 includes an upper film guide bracket 49 that may be formed of metal or suitable plastic. The upper film guide bracket 49 is secured to the mechanism plate 34 by a screw 50 and also by a screw 51, FIGURE 9, which has a shaft or bearing portion 62 on which an entrance guide roller 52 is rotatably mounted. Referring again to FIGURE 5 of the drawings, it will be observed that the upper film guide bracket 49 is provided with a horizontal upwardly facing shelf 53 the left end of which is directly underneath the entrance guide roller 52. Intermediate the ends of the upper film guide bracket 49 there is a concave upward circular section 54 which is concentric with the upper film sprocket 35 and extends above the axis of rotation of the shaft 37 on both sides. To the left of the upper film sprocket 35 the upper film guide bracket 49 is provided with a convexly curved upstanding section 55 which has a laterally extending vertical shoulder 56 that extends into a slot 57, FIGURE 18, in the aperture plate 27. The construction also is shown in FIGURE 20. A guide roller 58 is rotatably mounted on a shaft 59, FIGURE 8, which extends from the upper film guide bracket. The guide roller 58 has a central groove 60 for a purpose that will be apparent presently.

Rockably mounted on the shaft portion 62 of the screw 51, as shown in FIGURES 5 and 9 of the drawings, is an upper film loop former 61. The upper film loop former 61 has an intermediate concave downward circular section 63 which, in the position shown in FIGURE 5 of the drawings, is concentric with the upper film sprocket 35. This is the self threading position of the upper film loop former 61 and the concave circular section 63, in combination with depending sides 64 and 65, FIGURE 9, serve to guide the film 14 over the upper film sprocket 35.

It is desirable that means be provided for preventing the self threading of the film 14 in the event that the upper film loop former 61 is in the inoperative position shown, for example, in FIGURE 6. Here it will be observed that the upper film loop former 61 is provided with a depending tongue 66 which is arranged to interfit with the central groove 60, FIGURE 8, in the guide roller 58, when the upper film loop former is in the operative position. When the upper film loop former 61 is in the retracted position shown in FIGURE 6, the lead end 67 of the film 14 is directed centrally against the guide roller 58 and is lifted above the teeth of the upper film sprocket 35 thereby preventing any further automatic threading of the film 14.

With the upper film loop former 61 in the operative position, shown in FIGURE 5, the automatic threading of the lead end 67 of the film 14 continues. The lead end 67 is fed underneath the guide roller 58 and past a flange 68 which extends into a groove in the upper film sprocket 35. The lead end 67 of the film 14 then is directed along an arcuate surface 69 on the upper film guide bracket 49 and over the convexly curved upstanding section 55. The lead end 67 of the film 14 is guided in its movement over the section 55 by a concave downward loop forming surface 70 that is provided on the underside of the upper film loop former 61. The depending sides 64 and 65 extend substantially the entire length of the upper film loop former 61, as shown in FIGURES 7, 8 and 9 of the drawings, and thus serve to guide the lead end 67 of the film 14 along the path just described. The concave downward loop forming surface 70 is effective to form an upper film loop 71 whence the lead end 67 is directed downwardly past the upstanding section 55 and between the aperture plate 27 and the pressure plate 31. The upper surface of the upper film loop former 61 above and to the left of the loop forming surface 70 is knurled as indicated at 72 to facilitate the movement of the upper film loop former 61 to the film loop forming position.

The lead end 67 of the film 14 is fed downwardly after the upper film loop 71 is formed in front of the aperture plate 27 which is mounted on the shuttle housing 26. FIGURE 18 shows the aperture plate 27 and reference now will be had to it in connection with the illustrations in FIGURES 19, 20 and 21. In order to avoid contact with the image carrying portion of the film 14 a longitudinal groove 74 is provided in the aperture plate 27. FIGURES 20 and 21 show the relationship of the groove 74 to the image carrying portion of the film 14. The aperture plate 27 is secured to the shuttle housing 26 by screws 75 and 76. A raised portion 77 is formed along one side of the groove 74 and perforations 78, FIGURE 10, in the film 14 move therealong and past a shuttle tooth slot 79 through which a shuttle tooth 80, FIGURE 5, projects. It will be understood that the shuttle tooth 80 is driven in timed relation with respect to the upper and lower film sprockets 35 and 36 by the motor which drives the worm 45 in accordance with conventional practice to advance the film 14 in a stepwise fashion past a projection aperture 81 at the bottom of the groove 74.

With a view to locating the film 14 as it moves downwardly past the projection aperture 81 a guide bar or shoulder providing means 82 is secured by the screws 75 in overlying relation to the aperture plate 27. The edge of the film 14 along which the perforations 78 are located is guided by a shoulder 83 on the guide bar 82. The film 14 is lightly held against the shoulder 83 by extensions 84 which bear against the opposite edge of the film 14 and are carried by a side tension arm 85 having a central slot 86 which is movable with respect to a pin 87 that stands outwardly from the aperture plate 27. A spring 88 reacts between the pin 87 and the ends of the side tension arm 85 to bias the extensions 84 lightly against the adjacent edge of the film 14. In this manner the film 14 is held against the shoulder 83 and located accurately with respect to the aperture 81.

Referring particularly to FIGURES 5, 19 and 21, it will be observed that projections 89 extend upwardly and downwardly from the lens barrel support 28 for supporting the ends of the pressure plate 31. A leaf spring 90 urges the pressure plate 31 toward the aperture plate 27 with the film 14 being located therebetween. Pins 91 extending rearwardly from the lens barrel support 28 act to secure the ends of the spring 90 in tensioned relation to bias the pressure plate 31 toward the aperture plate 27. A projection aperture 92 is provided centrally lengthwise of the pressure plate 31 to register with the projection aperture 81 in the aperture plate 27. The projection aperture 92 is located at the bottom of a groove 93 which extends longitudinally of the pressure plate 31. The groove 93 is complementary to the groove 74 in the aperture plate 27 and is provided to avoid contact with the image carrying portion of the film 14.

Near the lower end of the aperture plate 27, as shown in FIGURE 18, there is a slot 96. It is provided to receive a shoulder 97, FIGURE 5, of a lower film guide bracket 98 which forms a part of the lower film loop forming means 48 referred to hereinbefore. The lower film guide bracket 98 can be formed of metal or plastic as may be desired. It is held in place on the mechanism plate 34 by screws 99 and 100, the latter being shown in FIGURE 12. The lower film guide bracket 98 is provided with a convexly curved depending section 101 which corresponds to the upstanding section 55 on the upper film guide bracket 49. Concentric with the lower film sprocket 36 is an intermediate concave downward section 102 which overlies the sprocket 36 and insures that the lead end 67 of the film 14 is properly directed to an exit guide roller 103 whence the film 14 is trained around the guide pulley 16, FIGURE 1, previously referred to. It will be observed that the guide roller 103 is rotatably mounted on a shaft portion 104 of the screw 100 as shown in FIGURE 12.

Cooperating with the lower film guide bracket 98 and corresponding to the upper film loop former 61 is a lower film loop former 106 which is rockably mounted on the shaft portion 104 of the screw 100 as shown more clearly in FIGURE 12. At its swinging end the lower film loop former 106 has a concave upward film loop forming surface 107 with upstanding sides 108 and 109 as shown more clearly in FIGURES 10 and 11. A lower film loop 110 is formed by the passage of the lead end 67 of the film 14 over the loop forming surface 107 and it directs the film 14 upwardly over the lower film sprocket 36. The lower film loop former 106 has an intermediate concave upward circular section 111 which is concentric with the lower film sprocket 36 when the lower film loop former 106 is in the loop forming position.

It will be understood that the upper film loop former 61 and the lower film loop former 106 can be formed of metal or plastic as may be desired. They can be formed of the same or different materials as described for the upper and lower film guide brackets 49 and 98.

It is desirable to operate the upper and lower film loop formers 61 and 106 to free the upper and lower film loops 71 and 110. For this purpose provision is made for swinging the upper and lower film loop formers 61 and 106 out of the loop forming positions shown in FIGURES 2 and 5 of the drawings to the positions shown in FIGURE 3. For this purpose upper and lower operating arms 113 and 114 are provided on the upper and lower loop formers 61 and 106 respectively. It will be observed in FIGURES 8 and 11 that the upper and lower operating arms 113 and 114 project, respectively, through slots 115 and 116 in the mechanism plate 34.

Figure 4:
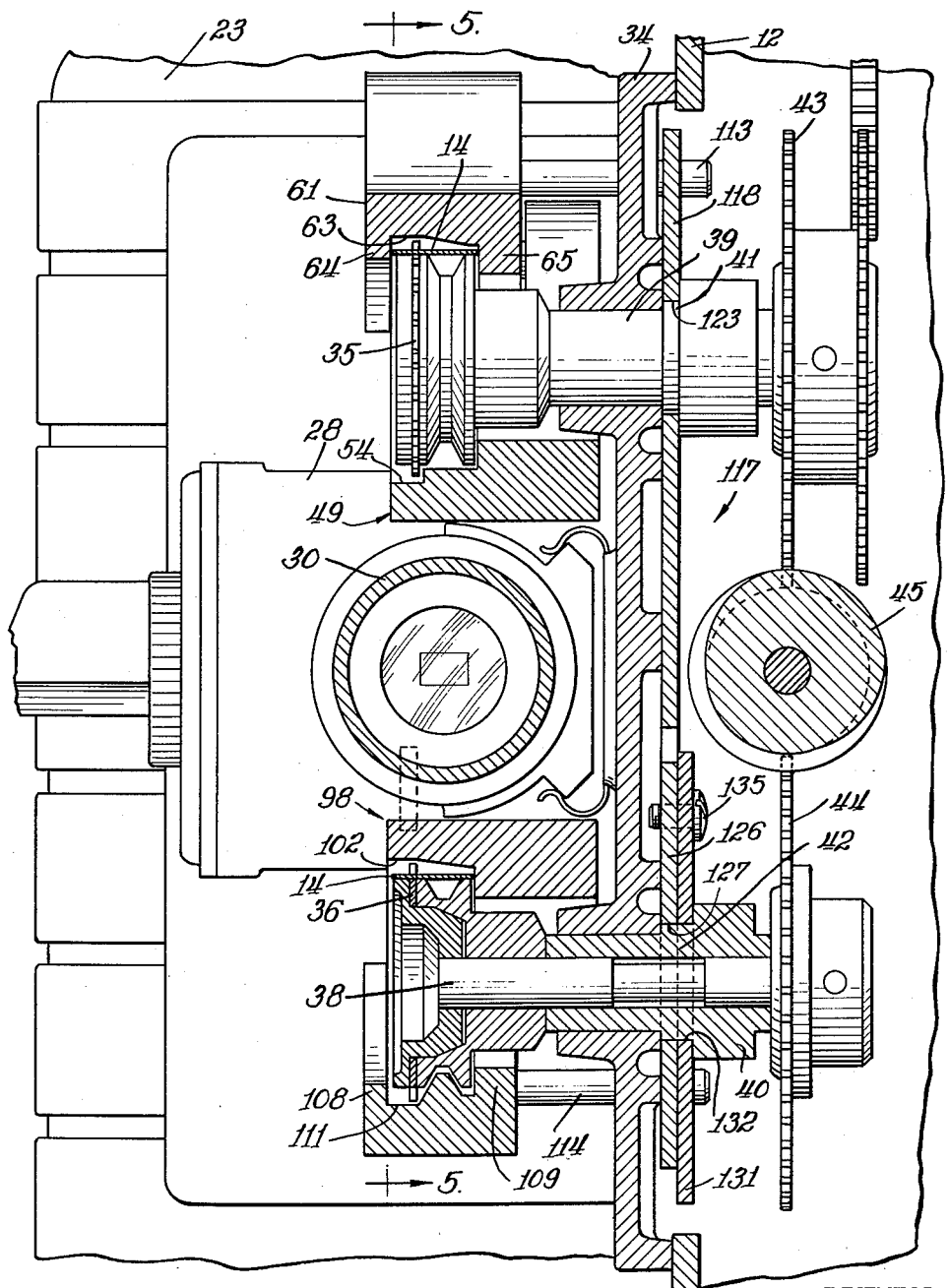
FIGURE 4 is a vertical sectional view, at an enlarged scale, taken generally along the line 4—4 of FIGURE 2.

FIGURES 2, 3 and 4 show, generally, at 117 operating means located in the rear of the support or upstanding frame plate 12 and mechanism plate 34 for effecting conjoint operation of the upper and lower film loop formers 61 and 106. FIGURES 13 to 17 inclusive show the details of construction of the operating means 117.

It will be observed that an upper operating lever 118, FIGURES 8 and 14, is provided having a slot 119 in its upper end for interfitting with the adjacent end of the upper operating arm 113. Adjacent the slot 119 there is an aperture 120 for receiving one end of a tension spring 121, FIGURE 2, the other end of which is secured at 122 on the mechanism plate 34. Intermediate the ends of the upper operating lever 118 is a central circular opening 123 that is arranged to rotate on the hub 41 of the upper bearing 39 as shown more clearly in FIGURE 8 of the drawings. At its lower end the upper operating lever 118 is provided with a slot 124 for sliding engagement with an arm 125 that extends upwardly from a lower operating lever, shown generally at 126 in FIGURE 15, and having a central slotted opening 127 that is arranged to rotate on a hub 42, FIGURE 4, which, as indicated hereinbefore, is formed on the lower bearing 40. Near the lower end of the lower operating lever 126 is a slot 128 for receiving the lower operating arm 114 which extends laterally from the lower film loop former 106. This construction is shown more clearly in FIGURE 11. The operating means 117, comprising the upper and lower operating levers 118 and 126, biased by the tension spring 121 functions to hold the upper and lower film loop formers 61 and 106 out of the loop forming positions as shown in FIGURE 3 of the drawings.

In order to accommodate manufacturing tolerances with respect to the upper and lower operating levers 118 and 126 and the parts on which they are mountd and with which they cooperate, the lower operating lever 126 is provided with the slotted opening 127 and is arranged to receive a bracket 131, FIGURE 16, which is provided with a central circular opening 132 for close fitting engagement with the hub 42, FIGURE 4, on the lower bearing 40. At the ends of the bracket 131 slots 133 are provided which overlie threaded openings 134 at the upper and lower ends of the lower operating lever 126, FIGURE 15. Through the provision of the central slotted opening 127 in the lower operating lever 126 and the slots 133 in the bracket 131, suitable adjustments can be made to effect proper operating relationship between the upper and lower operating levers 118 and 126 together with the upper and lower film loop formers 61 and 106. Screws 135, FIGURE 4, extend through the slots 133 and into the threaded openings 134 for securing the bracket 131 in proper position on the lower operating lever 126 with the slot 127 therein permitting its relative adjustment with respect to the hub 42. Once the proper relationship has been established between the upper and lower operating levers 118 and 126 with the bracket 131 secured thereon, the bracket 131 and the lower operating lever 126 function as a single unit and ordinarily this relationship, once established, need not be subsequently disturbed.

In order to hold the upper and lower film loop formers 61 and 106 in the film loop forming positions shown in FIGURE 2 of the drawings a detent 136 is formed integrally with the bracket 131 as shown more clearly in FIGURES 12 and 16 of the drawings. Cooperating with the detent 136 is a latch hook 137 that is located at the upper end of a latch lever 138, FIGURE 17, which is provided with an intermediate circular opening 139 to receive a bolt 140, FIGURE 13, which extends through the mechanism plate 34. In this manner the latch lever 138 is rotatably mounted intermediate its ends on the bolt 140. The upper arm of the latch lever 138 is provided with an aperture 141 for receiving one end of a tension spring 142, FIGURE 2, that is hooked into an aperture 143 in the mechanism plate 34 at the other end. The tension spring 142 acts to bias the latch lever 138 in a direction to hold the latch hook 137 in latching engagement with the detent 136, thereby holding the upper and low film loop formers 61 and 106 in the film loop forming positions shown in FIGURE 2. As shown in FIGURE 13 the latch lever 138 has an operating arm 144 with an intermediate section 145 that extends through a slot 146 in the support or upstanding frame plate 12 as shown more clearly in FIGURES 1, 2 and 3 of the drawings. As there shown the operating arm 144 has an end section 147 which extends into the path of movement of the control member or handle 25 which is movable into any one of three positions. The control member or handle 25 is movable from the "off" position to a central or "motor" position without engaging the end section 147 of the operating arm 144 which forms a part of the latch lever 138. However, when the control member or handle 25 is moved to the uppermost or "lamp" position, as shown in FIGURE 3, it engages the end section 147 and rocks the latch lever 138 in a clockwise direction against the biasing action of the tension spring 142 to move the latch hook 137 out of latching engagement with the detent 136. Thereupon the tension spring 121 acts to rock the upper operating lever 118 in a clockwise direction and therewith the lower operating lever 126 in a counter clockwise direction. Corresponding movements of the upper and lower film loop formers 61 and 106 are effected to swing them to the positions shown in FIGURE 3 out of loop forming position and out of engagement with the upper and lower film loops 71 and 110, thereby leaving them free for movement as the film 14 is fed for projection purposes past the projection aperture 81 by the shuttle tooth 80 in conventional manner.

In order to facilitate feeding of the lead end 67 of the film 14 for self threading purposes it is desirable that it have an end portion which is at right angles to the edges of the film 14. For this purpose a film cutter, shown generally at 150, is provided on the base 11 as shown in FIGURES 1, 2 and 3 of the drawings. The details of construction of the film cutter 150 are shown more clearly in FIGURE 22 of the drawings.

The film cutter 150, shown in FIGURE 22, includes a base plate 151 that is secured by rivets 152 to the base 11. A pin 153 extends upwardly from the plate 151 for receiving one of the perforations 78 in the film 14 as shown. The film is placed between upstanding guides 154 which orient it properly on the plate 151 so that an end portion 155 can be cut off at right angles to the film 14 by an edge 156 of a blade 157 which is flexibly connected at 158 to the plate 151 and is provided with a handle 159 which can be depressed to cut off the end portion 155. It will be understood that the end portion 155 of the film 14 is cut off only once and that, thereafter, the lead end 67 of the film 14 will be satisfactory for self threading.

In describing the operation of the self threading mechanism it will be assumed that the reel 13 having the film 14 wound thereon is mounted on the shaft 15 and that the take up reel 18 is mounted on its shaft 19. Also, it will be assumed that the conductors 22 are connected to a suitable current source for energization of the drive motor and of the projection lamp. Also, it will be assumed that the control member or handle 25 is in the "off" position and that the upper and lower film loop formers 61 and 106 are in the retracted positions shown in FIGURE 3 of the drawings. Next the operator engages the knurled surface 72 on the upper film loop former 61 and moves it downwardly. Through the interconnection provided by the upper and lower operating levers 118 and 126, the lower film loop former 106 is moved upwardly. The upper and lower film loop formers 61 and 106 are latched in the film loop forming positions shown in FIGURES 1, 2 and 5 of the drawings by the engagement of the latch hook 137 with the detent 136 on the bracket 131 as shown in FIGURE 2. After the operator has made sure that the lead end 67 of the film 14 is properly cut, as by cutting off the section 155 by the film cutter 150, the lead end 67 is placed on the shelf 53 and is moved underneath the entrance guide roller 52. The control member or handle 25 is moved to the "motor" position where the drive motor is energized to rotate the worm 45, FIGURE 4, and drive the upper and lower gear wheels 43 and 44. The upper and lower film sprockets 35 and 36 then are rotated in a film feeding direction and the shuttle tooth 80 is moved with the conventional reciprocatory movement. The teeth on the upper film sprocket 35 engage the perforations 78 in the film 14 and cause the lead end 67 to move underneath the intermediate concave downward circular section 63 of the upper film loop former 61. This surface together with the tongue 66 directs the lead end 67 of the film 14 underneath the guide roller 58. This guiding action is assisted by the flange 68 on the upper film guide bracket 49 and the lead end 67 is guided along the arcuate surface 69 and upwardly over the convexly curved upstanding section 55 of the upper film guide sprocket 49. The lead end 67 of the film 14 follows the concave downward loop forming surface 70 on the under side of the upper film loop former 61 to form the upper film loop 71 and then is directed thereby downwardly to the space between the shoulder 83 on the guide bar 82 and the shoulder 56 on the upper film guide bracket 49 as shown in FIGURE 20. The feeding continues and the lead end 67 of the film 14 is fed downwardly past the upper extension 84 of the side tension arm 85, the projection aperture 81 and the perforations 78 are engaged by the shuttle tooth 80 in conventional manner to advance the film 14 frame by frame past the projection aperture 81. The lead end 67 continues downwardly past the lower extension 84 of the side tension arm 85 and past the shoulder 97 of the lower film guide bracket 98 onto the concave upward film loop forming surface 107 of the lower film loop former 106 to form the lower film loop 110. The lead end 67 then is guided upwardly underneath the intermediate concave downward circular section 102 on the lower film guide bracket 98 and is picked up by the teeth of the lower film sprocket 36 and is moved thereabove and outwardly over the exit guide roller 103. This completes the self threading operation.

However, the control member or handle 25 remains in the "motor" position until a sufficient length of the film has been threaded past the exit guide roller 103 to permit its being placed over the guide pulleys 16 and 17 and to have the lead end 67 attached to the take up reel 18 so that the film 14 can be wound thereon.

Finally the control member or handle 25 is moved upwardly to the "lamp" position for energizing the projection lamp while continuing operation of the motor. This final upward movement of the control member or handle 25 moves the end section 147 of the latch lever 138 upwardly and moves the latch hook 137 out of latching engagement with the detent 136. The tension spring 121 then biases the upper and lower film loop formers 61 and 106 out of loop forming positions to free the upper and lower loops 71 and 110.

Should an attempt be made to thread the film 14 with the upper and lower film loop formers 61 and 106 in the non-loop forming position, the lead end 67, as shown in FIGURE 6, will engage the guide roller 58 and prevent further feeding until the loop formers are moved to the loop forming positions.

During the operation of the projector, should the operation be such as to lose one or the other of the loops 71 or 110, the operator can reform the loops merely by depressing the upper film loop former 61 momentarily. As soon as the loops are reformed, with the projector operating, the removal of pressure from the upper film loop former 61 permits them to be retracted in the manner previously described.

Since certain changes can be made in the foregoing construction and different embodiments of the invention can be made without departing from the spirit and scope thereof, it is intended that all matter shown in the accompanying drawings and described hereinbefore shall be considered as illustrative and not in a limiting sense.

What is claimed as new is:

1. In a motion picture projector, in combination, a support, a vertical aperture plate on said support having a projection aperture, upper and lower film sprockets rotatably mounted one above the other about horizontal axes on said support in front of and parallel to said aperture plate, an upper film guide bracket on said support having an intermediate concave upward circular section concentric with said upper film sprocket and underlying and spaced from the lower portion thereof, a convexly curved upstanding section at one end adjacent said aperture plate, and a horizontal upwardly facing shelf at the other end; an upper loop former pivoted at one end on said support and having an intermediate concave downward circular section concentric in loop forming position with said upper film sprocket and overlying and spaced from the upper portion thereof for guiding the lead end of said film around said upper film sprocket, a concave downward loop forming section at the other end overlying and spaced from said upstanding section on said upper film guide bracket for guiding said lead end of said film to form an upper loop and to move downwardly along said aperture plate past said projection aperture therein, and an upper operating arm; a lower film guide bracket on said support having an intermediate concave downward circular section concentric with said lower film sprocket and overlying and spaced from the upper portion thereof, a convexly curved depending section at one end adjacent said aperture plate, and an exit guide roller at the other end rotatable about an axis parallel to the axis of rotation of said lower film sprocket for guiding said film therefrom; a lower loop former pivoted at one end on said support about the axis of rotation of said exit guide roller and having a concave upward loop forming section at the other end underlying and spaced from said depending section on said lower film guide bracket for guiding said lead end of said film to form a lower loop as said lead end moves downwardly past the lower end of said aperture plate and for directing said lead end to said lower film sprocket, an intermediate concave upward circular section concentric in loop forming position with said lower film sprocket and overlying and spaced from the lower portion thereof, and a lower operating arm; and operating means connected to said upper and lower operating arms for rotating said upper and lower loop formers into and out of loop forming positions.

2. In a motion picture projector, in combination, a support, a vertical aperture plate on said support having a projection aperture, upper and lower film sprockets rotatably mounted one above the other about horizontal axes on said support in front of and parallel to said aperture plate, an upper film guide bracket on said support having an intermediate concave upward circular section concentric with said upper film sprocket and underlying and spaced from the lower portion thereof, a convexly curved upstanding section at one end adjacent said aperture plate, a horizontal upwardly facing shelf at the other end, an entrance guide roller above and at the end of said shelf adjacent said upper film sprocket and rotatable about an axis parallel to the axis of rotation thereof for guiding said film thereto, and a centrally grooved guide roller between said convexly curved section and said upper film sprocket and rotatable about an axis parallel to the axis of rotation thereof; an upper loop former pivoted at one end on said support about the axis of rotation of said entrance guide roller and having an intermediate concave downward circular section concentric in loop forming position with said upper film sprocket and overlying and spaced from the upper portion thereof for guiding the lead end of said film around said upper film sprocket and underneath said centrally grooved guide roller with the assistance of a tongue forming a continuation of the surface of said concave downward circular section and extending into the groove of said grooved guide roller, a concave downward loop forming section at the other end overlying and spaced from said upstanding section on said upper film guide bracket for guiding said lead end of said film to form an upper loop and to move downwardly along said aperture plate past said projection aperture therein, and an upper operating arm; said upper loop former in raised position having said concave downward circular section directed toward said grooved roller whereby further threading of said lead end of said film is prevented; a lower film guide bracket on said support having an intermediate concave downward circular section concentric with said lower film sprocket and overlying and spaced from the upper portion thereof, a convexly curved depending section at one end adjacent said aperture plate and an exit guide roller at the other end rotatable about an axis parallel to the axis of rotation of said lower film sprocket for guiding said film therefrom; a lower loop former pivoted at one end on said support about the axis of rotation of said exits guide roller and having a concave upward loop forming section at the other end underlying and spaced from said depending section on said lower film guide bracket for guiding said lead end of said film to form a lower loop as said lead end moves downwardly past the lower end of said aperture plate and for directing said lead end to said lower film sprocket, an intermediate concave upward circular section concentric in loop forming position with said lower film sprocket and overlying and spaced from the lower portion thereof, and a lower operating arm; and operating means connected to said upper and lower operating arms for rotating said upper and lower loop formers into and out of loop forming positions.

3. In a motion picture projector, in combination, a support, a vertical aperture plate on said support having a projection aperture, upper and lower film sprockets rotatably mounted one above the other about horizontal axes on said support in front of and parallel to said aperture plate, an upper film guide bracket on said support having an intermediate concave upward circular section concentric with said upper film sprocket and underlying and spaced from the lower portion thereof, a convexly curved upstanding section at one end adjacent said aperture plate, and a horizontal upwardly facing shelf at the other end; an upper loop former pivoted at one end on said support and having an intermediate concave downward circular section concentric in loop forming position with said upper film sprocket and overlying and spaced from the upper portion thereof for guiding the lead end of said film around said upper film sprocket, a concave downward loop forming section at the other end overlying and spaced from said upstanding section on said upper film guide bracket for guiding said lead end of said film to form an upper loop and to move downwardly along said aperture plate past said projection aperture therein, and an upper operating arm; a lower film guide bracket on said support having an intermediate concave downward circular section concentric with said lower film sprocket and overlying and spaced from the upper portion thereof, a convexly curved depending section at one end adjacent said aperture plate, and an exit guide roller at the other end rotatable about an axis parallel to the axis of rotation of said lower film sprocket for guiding said film therefrom; a lower loop former pivoted at one end on said support about the axis of rotation of said exit guide roller and having a concave upward loop forming section at the other end underlying and spaced from said depending section on said lower film guide bracket for guiding said lead end of said film to form a lower loop as said lead end moves downwardly past the lower end of said aperture plate and for directing said lead end to said lower film sprocket, an intermediate concave upward circular section concentric in loop forming position with said lower film sprocket and overlying and spaced from the lower portion thereof, and a lower operating arm; operating means for rotating said upper and lower loop formers into and out of loop forming positions including an upper operating lever rotatably mounted intermediate its ends on said support and connected to said upper operating arm, a lower operating lever rotatably mounted intermediate its ends on said support and connected to said upper operating lever and to said lower operating arm, and a tension spring connected to one of said operating levers and biasing said upper and lower loop formers out of their loop forming positions; and latch means cooperating with said operating means to hold said upper and lower loop formers in loop forming positions.

4. In a motion picture projector, in combination, a support, a vertical aperture plate on said support having a projection aperture, upper and lower film sprockets rotatably mounted one above the other about horizontal axes on said support in front of and parallel to said aperture plate, an upper film guide bracket on said support having an intermediate concave upward circular section concentric with said upper film sprocket and underlying and spaced from the lower portion thereof, a convexly curved upstanding section at one end adjacent said aperture plate, and a horizontal upwardly facing shelf at the other end; an upper loop former pivoted at one end on said support and having an intermediate concave downward circular section concentric in loop forming position with said upper film sprocket and overlying and spaced from the upper portion thereof for guiding the lead end of said film around said upper film sprocket, a concave downward loop forming section at the other end overlying and spaced from said upstanding section on said upper film guide bracket for guiding said lead end of said film to form an upper loop and to move downwardly along said aperture plate past said projection aperture therein, and an upper operating arm; a lower film guide bracket on said support having an intermediate concave downward circular section concentric with said lower film sprocket and overlying and spaced from the upper portion thereof, a convexly curved depending section at one end adjacent said aperture plate, and an exit guide roller at the other end rotatable about an axis parallel to the axis of rotation of said lower film sprocket for guiding said film therefrom; a lower loop former pivoted at one end on said support about the axis of rotation of said exit guide roller and having a concave upward loop forming section at the other end underlying and spaced from said depending section on said lower film guide bracket for guiding said lead end of said film to form a lower loop as said lead end moves downwardly past the lower end of said aperture plate and for directing said lead end to said lower film sprocket, an intermediate concave upward circular section concentric in loop forming position with said lower film sprocket and overlying and spaced from the lower portion thereof, and a lower operating arm; operating means for rotating said upper and lower loop formers into and out of loop forming positions including an upper operating lever rotatably mounted intermediate its ends on said support about said axis of rotation of said upper film sprocket and connected to said upper operating arm and, a lower operating lever rotatably mounted intermediate its ends on said support about said axis of rotation of said lower film sprocket and connected to said upper operating lever and to said lower operating arm, a detent carried by said lower operating lever, and a tension spring interconnecting said upper operating lever and said support and biasing said upper and lower loop formers out of their loop forming positions; a latch lever pivoted on said support and having a latch hook for engaging said detent to hold said upper and lower loop formers in their loop forming positions, a tension spring interconnecting said latch lever and said support and biasing said latch hook into latching engagement with said detent, and a control member movably mounted on said support for engaging said latch lever to move said latch hook out of latching engagement with said detent whereupon the first mentioned tension spring rotates said upper and lower loop formers away from their loop forming positions.

5. In a motion picture projector, in combination, a support, a longitudinally grooved vertical aperture plate on said support having a projection aperture at the bottom of the groove for receiving film perforated along one edge with the central image carrying portion of the film overlying the groove and spaced from the bottom thereof, shoulder providing means on said aperture plate along one side of said groove for guiding one edge of said film, said aperture plate having upper and lower slots along said other side of said groove, upper and lower film sprockets rotatably mounted one above the other about horizontal axes on said support in front of and parallel to said aperture plate, means on said support driving said upper and lower film sprockets; an upper film guide bracket on said support having an intermediate concave upward circular section concentric with said upper film sprocket and underlying and spaced from the lower portion thereof, a shoulder at one end interfitting with said upper slot in said aperture plate, a convexly curved upstanding section adjacent the upper end of said shoulder, a horizontal upwardly facing shelf at the other end in a plane above the axis of rotation of said upper film sprocket, an entrance guide roller above and at the end of said shelf adjacent said upper film sprocket and rotatable about an axis parallel to the axis of rotation thereof for guiding said film thereto, and a second guide roller between said convexly curved section and said upper film sprocket and rotatable about an axis parallel to the axis of rotation thereof; an upper loop former pivoted at one end on said support about the axis of rotation of said entrance guide roller and having an intermediate concave downward circular section concentric in loop forming position with said upper film sprocket and overlying and spaced from the upper portion thereof for guiding the lead end of said film around said upper film sprocket and underneath said second guide roller, a concave downward loop forming section at the other end overlying and spaced from said upstanding section on said upper film guide bracket for guiding said lead end of said film to form an upper loop and to enter the space between said shoulder providing means on said aperture plate and said shoulder at said one end of said upper film guide bracket, and an upper operating arm extending parallel to the axis of rotation of said upper film sprocket; a lower film guide bracket on said support having an intermediate concave downward circular section concentric with said lower film sprocket and overlying and spaced from the upper portion thereof, a shoulder at one end interfitting with said lower slot in said aperture plate, a convexly curved depending section adjacent the lower end of said shoulder, and an exit guide roller at the other end rotatable about an axis parallel to the axis of rotation of said lower film sprocket for guiding said film therefrom; a lower loop former pivoted at one end on said support about the axis of rotation of said exit guide roller and having a concave upward loop forming section at the other end underlying and spaced from said depending section on said lower film guide bracket for guiding said lead end of said film to form a lower loop as said lead end emerges from the space between said shoulder providing means on said aperture plate and said shoulder at said one end of said lower film guide bracket and for directing said lead end to said lower film sprocket, an intermediate concave upward circular section concentric in loop forming position with said lower film sprocket and overlying and spaced from the lower portion thereof, and a lower operating arm extending parallel to said axis of rotation of said lower film sprocket; operating means for rotating said upper and lower loop formers into and out of loop forming positions including an upper operating lever rotatably mounted intermediate its ends on said support about said axis of rotation of said upper film sprocket and having a slotted upper end slidably engaging said upper operating arm and a slotted lower end, a lower operating lever rotatably mounted intermediate its ends on said support about said axis of rotation of said lower film sprocket and having an arm at its upper end slidably engaging the slot in said lower end of said upper operating lever and a slotted lower end slidably engaging said lower operating arm, and a tension spring interconnecting said upper end of said upper operating lever and said support and biasing said upper and lower loop formers out of their loop forming positions; and latch means cooperating with said lower operating lever to hold said upper and lower loop formers in loop forming positions.

6. In a motion picture projector, in combination, a support, a longitudinally grooved vertical aperture plate on said support having a projection aperture at the bottom of the groove for receiving film perforated along one edge with the central image carrying portion of the film overlying the groove and spaced from the bottom thereof, shoulder providing means on said aperture plate along one side of said groove for guiding one edge of said film, said aperture plate having upper and lower film sprockets rotatably mounted one above the other about horizontal axes on said support in front of and parallel to said aperture plate, means on said support driving said upper and lower film sprockets; an upper film guide bracket on said support having an intermediate concave upward circular section concentric with said upper film sprocket and underlying and spaced from the lower portion thereof, a shoulder at one end interfitting with said upper slot in said aperture plate, a convexly curved upstanding section adjacent the upper end of said shoulder, a horizontal upwardly facing shelf at the other end in a plane above the axis of rotation of said upper film sprocket, an entrance guide roller above and at the end of said shelf adjacent said upper film sprocket and rotatable about an axis paralel to the axis of rotation thereof for guiding said film thereto, and a second guide roller between said convexly curved section and said upper film sprocket and rotatable about an axis parallel to the axis of rotation thereof; an upper loop former pivoted at one end on said support about the axis of rotation of said entrance guide roller and having an intermediate concave downward circular section concentric in loop forming position with said upper film sprocket and overlying and spaced from the upper portion thereof for guiding the lead end of said film around said upper film sprocket and underneath said second guide roller, a concave downward loop forming section at the other end overlying and spaced from said upstanding section on said upper film guide bracket for guiding said lead end of said film to form an upper loop and to enter the space between said shoulder providing means on said aperture plate and said shoulder at said one end of said upper film guide bracket, and and upper operating arm extending parallel to the axis of rotation of said upper film sprocket; a lower film guide bracket on said support having an intermediate concave downward circular section concentric with said lower film sprocket and overlying and spaced from the upper portion thereof, a shoulder at one end interfitting with said lower slot in said aperture plate, a convexly curved depending section adjacent the lower end of said shoulder, and an exit guide roller at the other end rotatable about an axis parallel to the axis of rotation of said lower film sprocket for guiding said film therefrom; a lower loop former pivoted at one end on said support about the axis of rotation of said exit guide roller and having a concave upward loop forming section at the other end underlying and spaced from said depending section on said lower film guide bracket for guiding said lead end of said film to form a lower loop as said lead end emerges from the space between said shoulder providing means on said aperture plate and said shoulder at said one end of said lower film guide bracket and for directing said lead end to said lower film sprocket, an intermediate concave upward circular section concentric in loop forming position with said lower film sprocket and overlying and spaced from the lower portion thereof, and a lower operating arm extending parallel to said axis of rotation of said lower film sprocket; operating means for rotating said upper and lower loop formers into and out of loop forming positions including an upper operating lever rotatably mounted intermediate its ends on said support about said axis of rotation of said upper film sprocket and having a slotted upper end slidably engaging said upper operating arm and a slotted lower end, a lower operating lever rotatably mounted intermediate its ends on said support about said axis of rotation of said lower film sprocket and having an arm at its upper end slidably engaging the slot in said lower end of said upper operating lever and a slotted lower end slidably engaging said lower operating arm and a laterally extending detent, and a tension spring interconnecting said upper end of said upper operating lever and said support and biasing said upper and lower loop formers out of their loop forming positions; a latch lever pivoted intermediate its ends on said support and having a latch hook at its upper end for engaging said detent to hold said upper and lower loop formers in their loop forming positions and an operating arm at its lower end, and a tension spring interconnecting said upper end of said latch lever and said support and biasing said latch hook into latching engagement with said detent.

7. In a motion picture projector, a mechanism plate, a generally vertical aperture plate mounted on the mechanism plate, a sprocket on the mechanism plate, an inner bracket member mounted on the mechanism plate and having a convex loop forming portion adjacent the lower end of the aperture plate and a sprocket guard portion adapted to guide film to the sprocket and hold the film in mesh with the sprocket, and a concave loop former pivotally mounted on the mechanism plate and movable between an operative position in which the loop former defines a loop path with the loop forming portion of the bracket member and also guides with the bracket member the forward end of film into the sprocket and sprocket guard portion of the bracket member and a retracted position in which the loop former is completely out of the path of the film.

8. In a motion picture projector, a loop forming means movable between a loop forming position and a retracted position, an upper sprocket adapted to mesh with and push the leading end of a perforated film through the loop forming means when the film is held in mesh therewith, first sprocket guard means adapted to guide the leading end of the film toward the sprocket, second sprocket guard means positioned so as to block the advance of the leading end of the film as the leading end of the film comes thereto from the sprocket and the first sprocket guard means and to coact with the first sprocket guard means to hold the film in mesh with the sprocket after the leading end of the film has been moved to one side of the second sprocket guard means, and threading means positioned by the loop forming means when the loop forming means is in its operative position to guide the leading end of the film to one side of the second sprocket guard means, the threading means also being retracted by the loop forming means when the loop forming means is moved to its retracted position to a position not guiding the film to one side of the second sprocket guard means.

9. In a motion picture projector, a sprocket, means including a first guide roller for guiding the leading end of a perforated film into peripheral engagement with the sprocket, a second roller spaced beyond the first roller in a position adapted to coact with the first roller to hold the film in mesh with the sprocket after the leading end of the film has passed to one side of the second roller, the second roller being so positioned relative to the sprocket and the first roller that the leading end of the film normally engages the second roller on the side thereof, opposite to said one side thereof, and a loop former movable between a retracted position and an operative position and having a combined blocking and pushing portion which coacts with the second roller to initially block the leading end of the film when the film is being threaded around the sprocket and the loop former is in its retracted position, the blocking and pushing portion serving when the loop former is moved to its operative position to guide the leading end of the film to said one side of the second roller so that the film travels around said one side.

References Cited in the file of this patent

UNITED STATES PATENTS

| | | |
|---|---|---|
| 1,846,569 | Owens | Feb. 23, 1932 |
| 1,913,853 | Owens | June 13, 1933 |
| 2,127,143 | Ross | Aug. 16, 1938 |
| 2,142,493 | Carpenter | Jan. 3, 1939 |
| 2,172,235 | Aldinger | Sept. 5, 1939 |
| 2,396,243 | Boisselier | Mar. 12, 1946 |
| 2,420,587 | Dietrich | May 13, 1947 |
| 2,472,143 | Briskin | June 7, 1949 |
| 2,712,770 | Bolsey et al. | July 12, 1955 |
| 2,832,258 | Chevallaz | Apr. 29, 1958 |

FOREIGN PATENTS

| | | |
|---|---|---|
| 512,453 | Great Britain | Sept. 15, 1939 |